United States Patent
Liu et al.

(10) Patent No.: US 8,907,616 B2
(45) Date of Patent: Dec. 9, 2014

(54) HYBRID POWER SUPPLY SYSTEM

(75) Inventors: Zhi-Xiang Liu, Beijing (CN); Cheng Wang, Beijing (CN); Xiang-Ming He, Beijing (CN); Jian-Jun Li, Beijing (CN); Jian-Wei Guo, Beijing (CN); Jian Gao, Beijing (CN)

(73) Assignees: Tsinghua University, Beijing (CN); Hon Hai Precision Industry Co., Ltd., New Taipei (TW)

( * ) Notice: Subject to any disclaimer, the term of this patent is extended or adjusted under 35 U.S.C. 154(b) by 467 days.

(21) Appl. No.: 13/326,031

(22) Filed: Dec. 14, 2011

(65) Prior Publication Data

US 2013/0002023 A1    Jan. 3, 2013

(30) Foreign Application Priority Data

Jun. 30, 2011    (CN) .......................... 2011 1 0181489

(51) Int. Cl.
*H01M 10/44* (2006.01)
*H01M 10/46* (2006.01)
*H01M 16/00* (2006.01)

(52) U.S. Cl.
CPC ............ *H01M 10/46* (2013.01); *H01M 16/006* (2013.01)
USPC .............................................. 320/101; 429/9

(58) Field of Classification Search
CPC ......................................................... H02J 7/35
USPC ................ 320/101, 104; 429/9, 19; 180/65.2; 701/22
See application file for complete search history.

(56) References Cited

U.S. PATENT DOCUMENTS

| | | | | |
|---|---|---|---|---|
| 5,991,670 | A * | 11/1999 | Mufford et al. | 701/22 |
| 6,580,977 | B2 * | 6/2003 | Ding et al. | 701/22 |
| 6,781,343 | B1 | 8/2004 | Demachi et al. | |
| 6,917,181 | B2 * | 7/2005 | Emori et al. | 320/104 |
| 7,521,138 | B2 * | 4/2009 | Pearson | 429/9 |
| 2003/0207156 | A1 * | 11/2003 | Ovshinsky et al. | 429/9 |
| 2004/0160209 | A1 | 8/2004 | Emori et al. | |
| 2009/0108799 | A1 | 4/2009 | Ko et al. | |
| 2009/0146493 | A1 * | 6/2009 | Fujino et al. | 307/9.1 |
| 2011/0001453 | A1 | 1/2011 | Goto et al. | |
| 2012/0219829 | A1 | 8/2012 | Shimura et al. | |

FOREIGN PATENT DOCUMENTS

| | | |
|---|---|---|
| CN | 101882689 | 11/2010 |
| WO | WO0225761 | 3/2002 |
| WO | WO2011034112 | 3/2011 |

* cited by examiner

*Primary Examiner* — Yalkew Fantu
(74) *Attorney, Agent, or Firm* — Novak Druce Connolly Bove + Quigg LLP

(57) ABSTRACT

A hybrid power supply system includes a number of power modules electrically connected with each other in series. Each power module includes a fuel cell unit and a lithium-ion battery unit. Each fuel cell unit includes at least two fuel cell monomers electrically connected with each other in series. Each lithium-ion battery unit includes one or more lithium ion battery monomers electrically connected with each other in parallel. Each fuel cell unit is electrically connected with each lithium-ion battery unit in parallel to directly charge the lithium-ion battery unit.

13 Claims, 8 Drawing Sheets

HYBRID POWER SUPPLY SYSTEM

CROSS-REFERENCE TO RELATED APPLICATIONS

This application claims all benefits accruing under 35 U.S.C. §119 from China Patent Application No. 201110181489.3, filed on Jun. 30, 2011, in the China Intellectual Property Office, the contents of which are hereby incorporated by reference.

BACKGROUND

1. Technical Field

The present disclosure relates to a hybrid power supply system. More specifically, relates to a system including lithium ion batteries and fuel cells.

2. Description of Related Art

A hybrid power supply system includes a fuel cell pack with a plurality of fuel cells connected in series and a lithium-ion battery pack with a plurality of lithium ion batteries connected in series. The fuel cell pack may be used to charge the whole lithium ion battery pack. More specifically, the fuel cell pack charges each of lithium ion batteries at the same time. However, performances of the lithium ion batteries may be different because of fabrication errors. An inconformity of charging and discharging between the lithium ion batteries may occur from these different performances. One lithium ion battery may be over charged or over discharged, which will influence the safety, charging and discharging capacity, and life span of the whole lithium ion battery pack.

Battery management systems are always used to regulate the charging and discharging inconformity between the lithium ion batteries in the pack connected in series. However, this way of regulating has a relatively low effective utilization of the electrical quantity of the lithium ion battery pack. In addition, these battery management systems have complex regulating circuits used for regulating the inconformity between lithium ion batteries in the pack. Therefore, the cost of a hybrid power supply system cannot be lowered.

What is needed, therefore, is to provide a hybrid power supply system with a relatively long cycle life and a low cost.

BRIEF DESCRIPTION OF THE DRAWING

Many aspects of the present disclosure can be better understood with reference to the following drawings. The components in the drawings are not necessarily to scale, the emphasis instead being placed upon clearly illustrating the principles of the present embodiments.

DETAILED DESCRIPTION

The disclosure is illustrated by way of example and not by way of limitation in the figures of the accompanying drawings in which like references indicate similar elements. It should be noted that references to "another," "an," or "one" embodiment in this disclosure are not necessarily to the same embodiment, and such references mean at least one.

Figure 1:
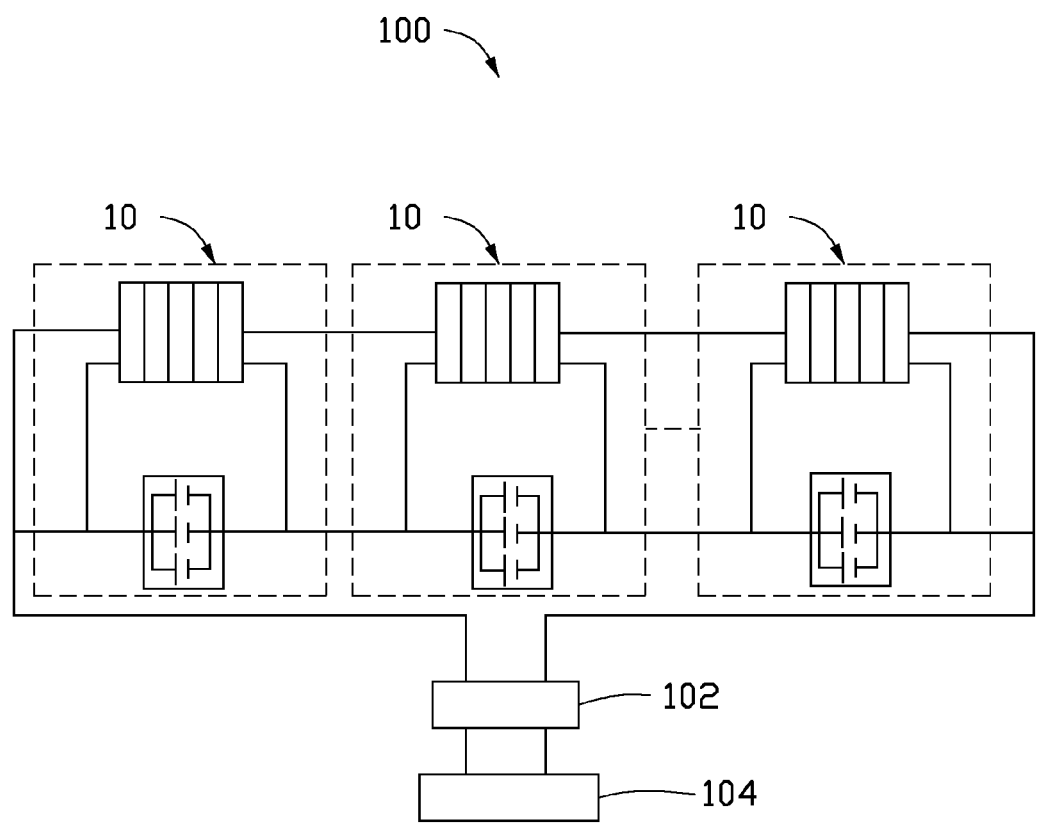
FIG. 1 is a schematic view of an embodiment of a structure of a hybrid power supply system.
Figure 2:
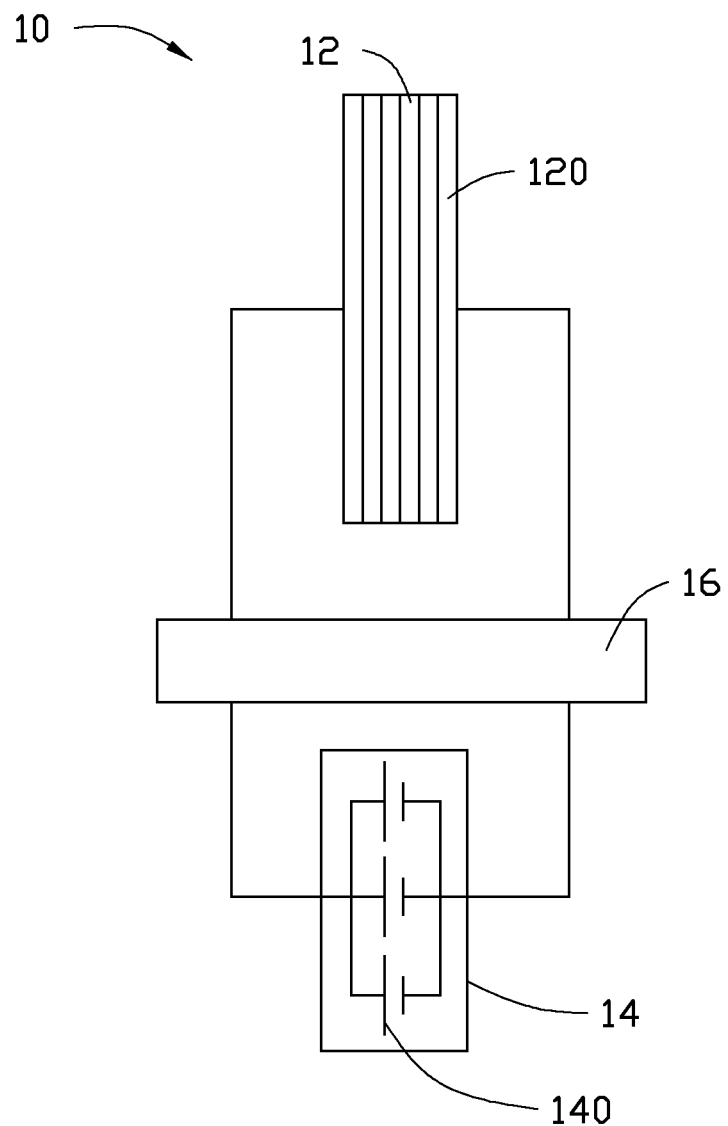
FIG. 2 is a schematic structural view of the embodiment of a power module in the hybrid power supply system.

Referring to FIG. 1 and FIG. 2, one embodiment of a hybrid power supply system 100 includes a plurality of power modules 10 electrically connected with each other in series.

Each of the plurality of power modules 10 includes a fuel cell unit 12 and a lithium-ion battery unit 14. The fuel cell unit 12 and the lithium-ion battery unit 14 are electrically connected with each other in parallel. The fuel cell unit 12 can be used to directly charge the lithium-ion battery unit 14. At least one of the fuel cell unit 12 and lithium-ion battery unit 14 can supply power to an external load. The power module 10 can further include a switch electrically connected with the fuel cell unit 12 and the lithium ion battery unit 14. The switch can be used to control the charging time period of the fuel cell unit 12 to the lithium-ion battery unit 14 according to capacity of the lithium-ion battery unit 14.

The power module 10 can further include a battery management unit 16. The battery management unit 16 can be used for controlling the time period of charging the lithium-ion battery unit 14 conducted by the fuel cell unit 12, a discharging end time period of the lithium-ion battery unit 14 and fuel cell unit 12. The battery management unit 16 also can control the supply of the fuel or oxidant for the fuel cell unit 12.

The fuel cell unit 12 can include at least two fuel cell monomers 120 electrically connected with each other in series. A fuel and an oxidant needed by the fuel cell unit 12 can be shared between the fuel cell monomers 120. The fuel can be hydrogen or methanol. The oxidant can be air. In one embodiment, the fuel is hydrogen, and the oxidant is air. An open circuit voltage of the fuel cell unit 12 can be about twice to four times greater than a cut-off charge voltage of the lithium-ion battery unit 14. In one embodiment, the open circuit voltage of the fuel cell unit 12 is about 2 times greater than the cut-off charge voltage of the lithium-ion battery unit 14. A short-circuit current of the fuel cell unit 12 can be smaller or equal to a maximum charge current of the lithium-ion battery unit 14 to prolong a life of the lithium-ion battery unit 14. The short-circuit current refers to a current flowing along the fuel cell unit 12 when two output ends of the fuel cell unit 12 are shorted. One of the at least two fuel cell monomers 120 can be an alkaline fuel cell, a solid oxide fuel cell, or a proton membrane exchange fuel cell. An amount of the at least two fuel cell monomers 120 can be decided by the cut-off charge voltage of the lithium-ion battery unit 14. A series voltage of the at least two fuel cell monomers 120 should be greater than the cut-off charge voltage of the lithium-ion battery unit 14. In one embodiment, the fuel cell unit 12 includes five fuel cell monomers 120, and the open circuit voltage of each of the five fuel cell monomers 120 is about 1 volt.

The lithium-ion battery unit 14 can include one lithium ion battery monomer 140 or more lithium ion battery monomers 140 electrically connected with each other in parallel. In one embodiment, the lithium-ion battery unit 14 includes three lithium ion battery monomers 140 electrically connected with each other in parallel. Overcharging of each of the lithium ion battery monomers 140 can be avoided when electrically connected in parallel. The lithium ion battery monomer 140 can be a lithium iron phosphate battery, lithium cobalt oxide battery, lithium manganese oxide battery, or lithium cobalt manganese oxide battery. If the lithium iron phosphate battery is selected as the lithium ion battery monomer 140, an operation voltage can be in a range from about 2.5 volts to about 3.6 volts. If the lithium manganese oxide battery is selected as the lithium ion battery monomer 140, the operation voltage can be in a range from about 3 volts to about 4 volts. The cut-off charge voltage of the lithium-ion battery unit 14 refers to a maximum charge voltage accepted by the lithium-ion battery unit 14 when charged by the fuel cell unit 12. A cut-off discharge voltage of the lithium-ion battery unit 14 refers to a maximum discharge voltage providing for the external load. In one embodiment, the lithium cobalt oxide battery is selected as the lithium ion battery monomer 140, the cut-off charge voltage of the lithium cobalt oxide battery is about 4.2 volts, the cut-off discharge voltage of the lithium cobalt oxide battery is about 3.2 volts, and a discharge capacity of the lithium cobalt oxide battery is about 3 ampere-hour (Ah).

In each power module 10, the lithium-ion battery unit 14 is electrically connected in parallel with the fuel cell unit 12. The fuel cell unit 12 can adaptively charge the lithium-ion battery unit 14 according to inherent discharge characteristics of the fuel cell unit 12. The parallel-connected fuel cell unit 12 and the lithium-ion battery unit 14 also can adaptively supply power for the external load according to inherent discharge characteristics of the fuel cell unit 12 and lithium-ion battery unit 14. Processes of the adaptively charging and adaptively supplying the power for the external load refer to dynamic matching processes complying with the inherent charge-discharge characteristics of the fuel cell unit 12 and the lithium-ion battery unit 14. The processes of the adaptively charging and adaptively supplying the power for the external load are described referring from FIG. 3 to FIG. 6.

Figure 3:
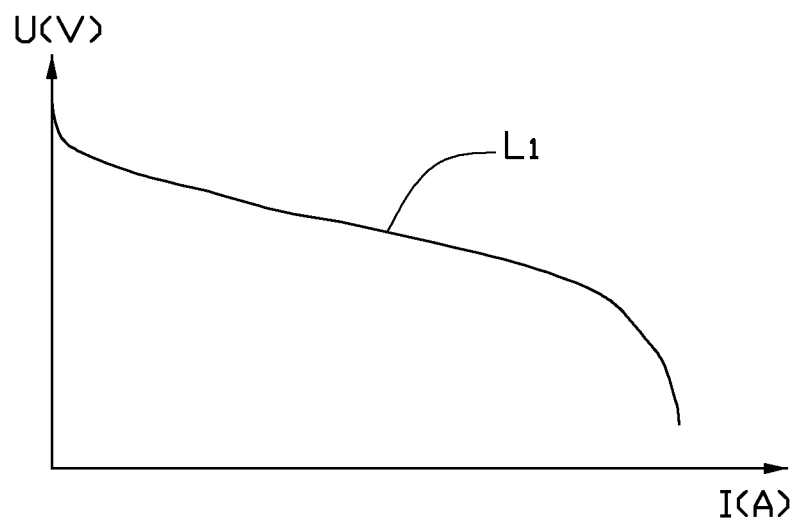
FIG. 3 is a schematic view of discharge characteristic curves of an embodiment of a lithium-ion battery unit and a fuel cell unit used in the power module.
Figure 3:
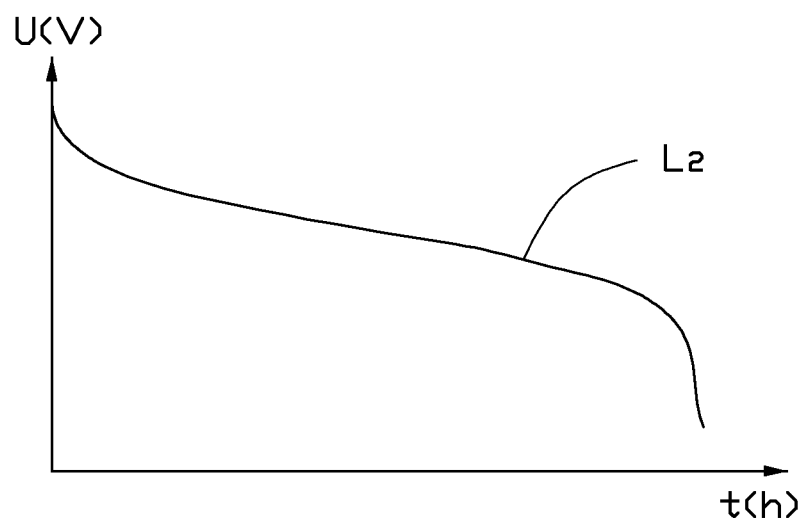

Referring to FIG. 3, $L_1$ is a discharge curve of the fuel cell unit 12. $L_2$ is the discharge curve of the lithium-ion battery unit 14. In the curve $L_1$, the output current I is gradually increased with the decrease of the output voltage U of the fuel cell unit 12. In the curve $L_2$, the lithium-ion battery unit 14 discharges at a constant current. The output voltage U of the lithium-ion battery unit 14 decreases with discharge time t increasing. When the power of the lithium-ion battery unit 14 is nearly exhausted, the output voltage U of the lithium-ion battery unit 14 decreases rapidly.

Figure 4:
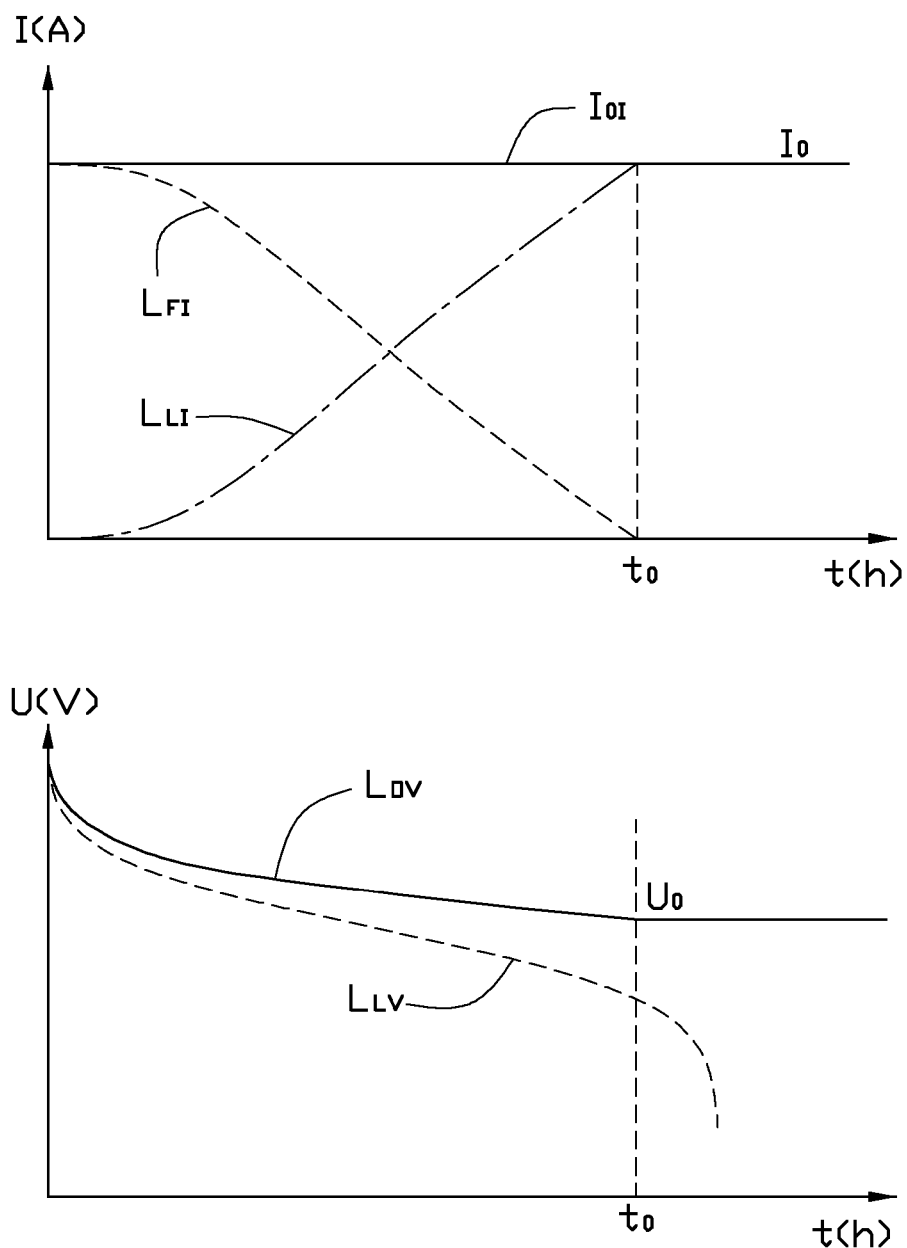
FIG. 4 is a schematic view of voltage and current curves of an embodiment of the power module at a first situation of the power module adaptively providing power for an external load in which an operating current needed by the external load is smaller than a maximum output current of the fuel cell unit can provide.

Referring to FIG. 4, a first situation of the power module 10 adaptively providing power for the external load is shown. The first situation is conducted in a condition that an operating current $I_o$, which is needed by the external load, is smaller than a maximum output current of the fuel cell unit 12 can provide. Curve $L_{oI}$ refers to the operating current $I_o$ of the power module 10. Curve $L_{LI}$ refers to the output current $I_L$ of the lithium-ion battery unit 14 during the discharging process of the power module 10. Curve $L_{FI}$ refers to the output current $I_F$ of the fuel cell unit 12 during the discharging process of the power module 10. Curve $L_{ov}$ refers to the output voltage U of the power module 10. Curve $L_{Lv}$ is a comparative curve referring to the output voltage $U_L$ of the lithium-ion battery unit 14 when providing power to the external load independently. The power module 10 provides a constant operating current $I_o$ for the external load. In an early stage of discharging, the output voltage U of the parallel-connected fuel cell unit 12 and the lithium-ion battery unit 14 is relatively high. In this stage, the lithium-ion battery unit 14 is a main supplier of power for the external load. Then, the output current $I_L$ of the lithium-ion battery unit 14 gradually decreases and meanwhile the output current $I_F$ of the fuel cell unit 12 gradually increases with time. The output current $I_L$ of the lithium-ion battery unit 14 will decrease to zero and the output current $I_F$ of the fuel cell unit 12 will increase to the operating current $I_o$ when the output voltage U of power module 10 decreases to $U_o$ in the discharge time $t_0$. In this stage of the time $t_0$, the fuel cell unit 12 is a main supplier of power for the external load, and the lithium-ion battery unit 14 will no longer provide power for the external load. After the time $t_0$, the output voltage U of the power module 10 will keep to the constant output voltage $U_o$ to provide power for the external load for a maximum. In contrast, if the external load is only supplied power by the lithium-ion battery unit 14, the external load will not receive a power supply after a short time, as shown by the line $L_{Lv}$.

Figure 5:
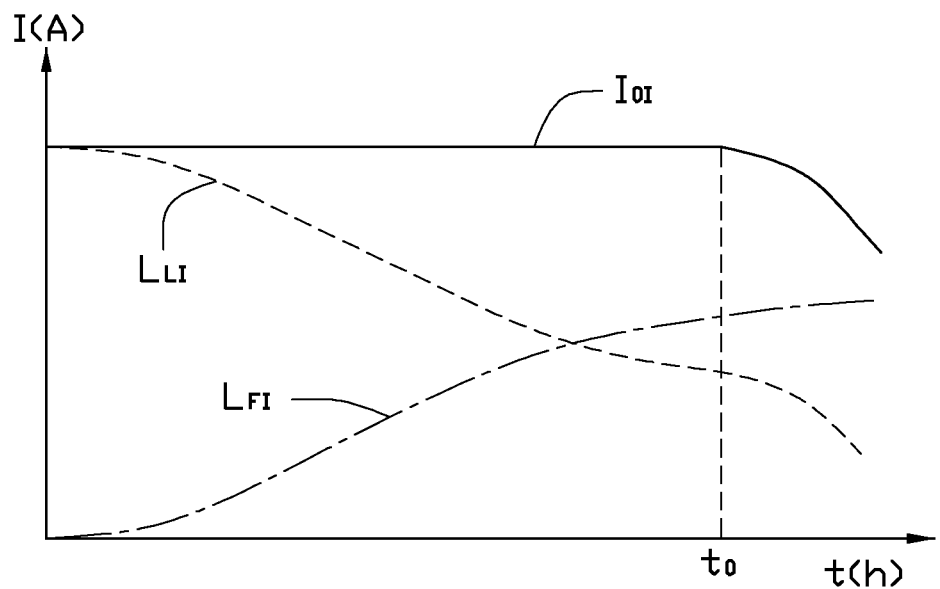
FIG. 5 is a schematic view of voltage and current curves of an embodiment of the power module at a second situation of the power module adaptively providing power for the external load in which an operating current needed by the external load is greater than a maximum output current of the fuel cell unit can provide.
Figure 5:
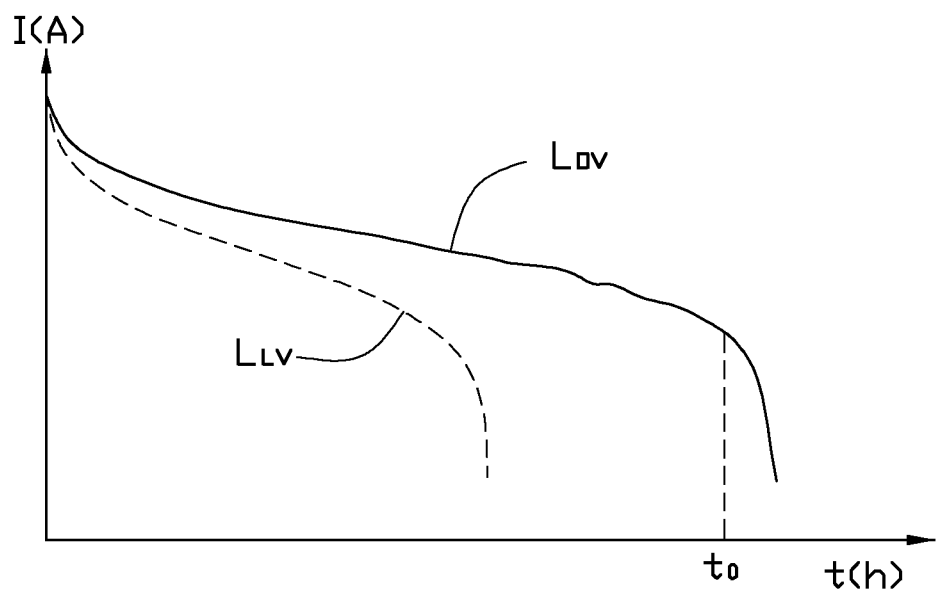

Referring to FIG. 5, a second situation of the power module 10 adaptively providing power for the external load is shown. The second situation is conducted in a condition that the operating current $I_o$ needed by the external load is greater than the maximum output current the fuel cell unit 12 can provide. It is similar to the first situation in FIG. 4, the output voltage U of the power module 10 gradually decreases with the discharging depth increasing thereof. In other words, the output current $I_F$ of the fuel cell unit 12 in the power module 10 correspondingly increases, and the output current $I_L$ of the lithium-ion battery unit 14 in the power module 10 correspondingly decreases. When the output current $I_F$ of the fuel cell unit 12 increases close to the maximum output current, a range of the output current $I_F$ increasing is small. Meanwhile the output current $I_L$ of the lithium-ion battery unit 14 gradually decreases. After the time $t_o$, the output current provided both by the fuel cell unit 12 and the lithium-ion battery unit 14 is smaller than the operating current $I_o$ which the external load needs. The power module 10 to prevent over discharging of the lithium-ion battery unit 14 should stop the power supply.

Figure 6:
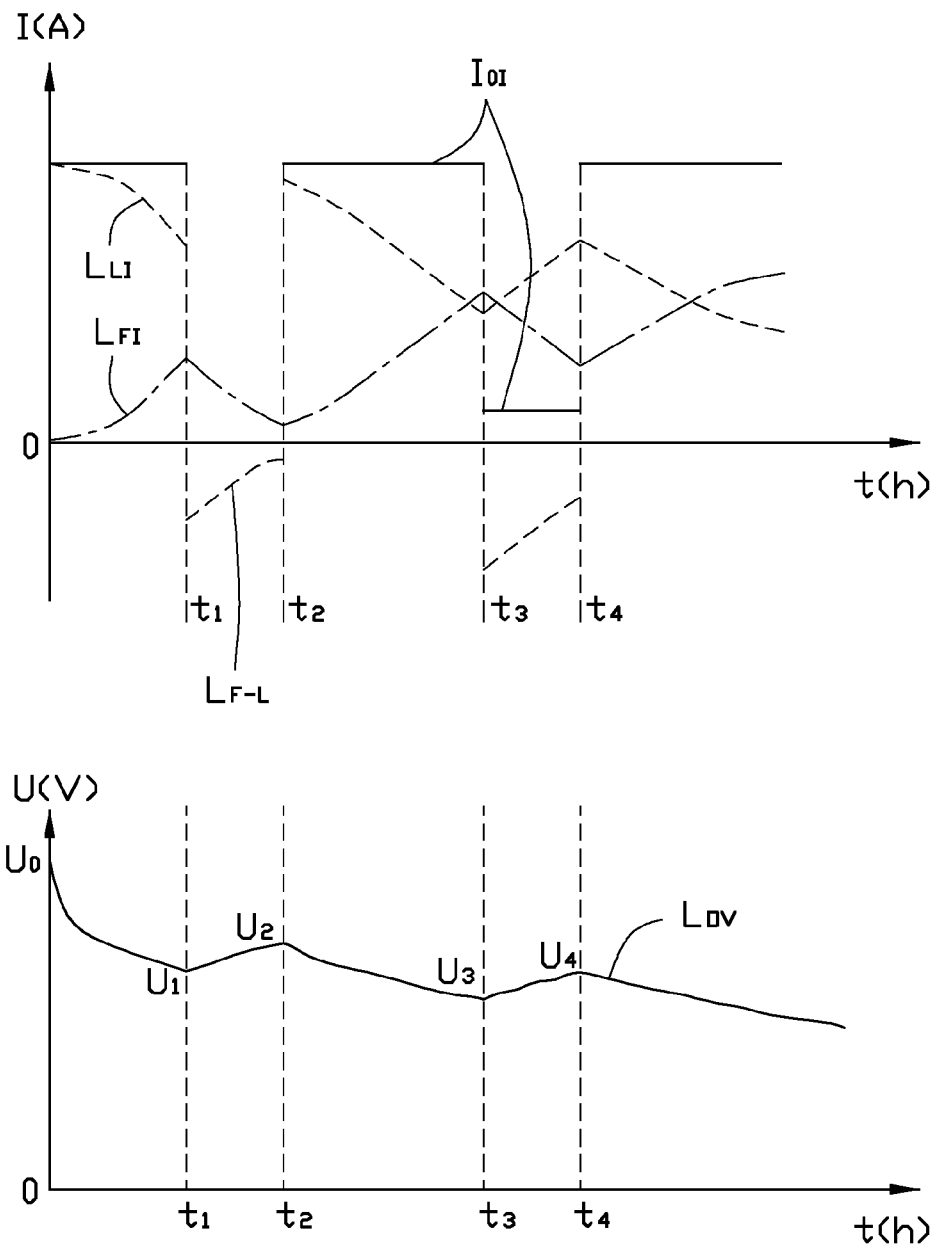
FIG. 6 is a schematic view of voltage and current curves of an embodiment of the hybrid power supply system in a process of the power module adaptively providing power for the external load and meanwhile the fuel cell unit charging the lithium-ion battery unit.

Referring to FIG. 6, a working process of the power module 10 is shown. During the working process, the power module 10 adaptively provides power for the external load and meanwhile the fuel cell unit 12 charges the lithium-ion battery unit 14. The output current of the power module 10 can be kept to a constant current $I_1$ during the time period from zero to $t_1$. With the discharging time increasing, the output voltage U of the power module 10 decreases from the $U_0$ to $U_1$. In other words, the output current $I_L$ of the lithium-ion battery unit 14 gradually decreases, and the output current $I_F$ of the fuel cell unit 12 correspondingly increases in this time period which is similar to the process described in FIG. 4 and FIG. 5. Curve $L_{F-L}$ refers to a charging current $I_{F-L}$ of the lithium-ion battery unit 14 for the lithium-ion battery unit 14. During the time period of $(t_1, t_2)$, the power module 10 stops to provide power for the external load, and the fuel cell unit 12 charges the lithium-ion battery unit 14. The output voltage U of the power module 10 increases from $U_1$ to $U_2$ after the charging, and the output current of the fuel cell unit 12 (or the charging current $I_{F-L}$) gradually decreases. During the time period of $(t_2, t_3)$, the power module 10 continues to provide power for the external load. The output voltage U of the power module 10 decreases from $U_2$ to $U_3$. The output current of the power module 10 decreases from $I_1$ to $I_2$ when reached time point $t_3$. During the time period of ($t_3$, $t_4$), the fuel cell unit 12 not only can provide power for the external load but also can charge the lithium-ion battery unit 14 as the output current needed ($I_2$) is small. The output voltage U of the power module 10 increases from $U_3$ to $U_4$ after charging. Both the fuel cell unit 12 and the lithium-ion battery unit 14 can provide power for the external load in the following time period after time $t_4$.

Referring from FIG. 4 to FIG. 6, it shows that the fuel cell unit 12 and the lithium-ion battery unit 14 in the power module 10 can adaptively adjust the output current provided to the external load. In addition, the output voltages of the fuel cell unit 12 and the lithium-ion battery unit 14 increase or decrease at the same time because of being electrically connected in parallel. Therefore, when the output voltage of the lithium-ion battery unit 14 decreases to a stage that the lithium-ion battery unit 14 is needed to be charged, the output voltage of the fuel cell unit 12 meanwhile, decreases and the output current of the fuel cell unit 12 increases correspondingly. Therefore, the fuel cell unit 12 can charge the lithium-ion battery unit 14 by using the increased output current.

Figure 7:
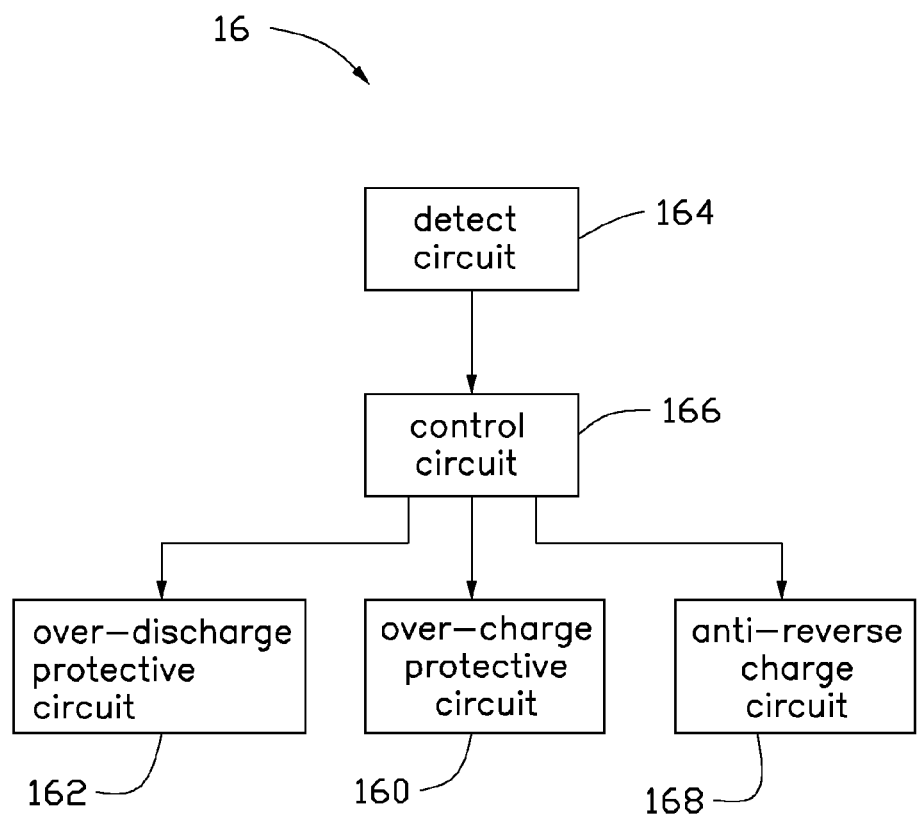
FIG. 7 is a functional block diagram of an embodiment of a battery management unit in the power module.

Referring to FIG. 7, the battery management unit 16 can include an over-charge protective circuit 160, an over-discharge protective circuit 162, a detecting circuit 164, and a control circuit 166. The over-charge protective circuit 160 prevents the lithium-ion battery unit 14 from being overcharged by the fuel cell unit 12. The over-discharge circuit 162 prevents the fuel cell unit 12 and the lithium-ion battery unit 14 from over discharging. The detecting circuit 164 detects data such as voltage and temperature of the fuel cell unit 12 and the lithium-ion battery unit 14. The control circuit 166 can control the charging and discharging of the lithium-ion battery unit 14 and the discharging of the fuel cell unit 12 according to the data detected by the detecting circuit 164. In other words, data such as the cut-off charge voltage and the cut-off discharge voltage of the lithium-ion battery unit 14 can be preset in the control circuit 166. The output voltage of the lithium-ion battery unit 14 can be compared with the preset cut-off charge voltage and the preset cut-off discharge voltage to judge whether to charge the lithium-ion battery unit 14 or to prevent from over-charging or over-discharging. The control circuit 166 also can prevent the lithium-ion battery unit 14 from being damaged such as over heated according to the temperatures and current values. The fuel and oxidant can be supplied to the fuel cell unit 12 by detecting the output voltage. The temperature of the fuel cell unit 12 can be detected by the detecting circuit 164 to control the cycling of a coolant used for cooling the fuel cell unit 12.

The battery management unit 16 can further include an anti-reverse charge circuit 168. The anti-reverse charge circuit 168 can be used for preventing the fuel cell unit 12 from being charged by the lithium-ion battery unit 14. The anti-reverse charge circuit 168 can be realized by using a diode.

With respect to charging, the battery management unit 16 only detects the data such as the voltage and temperature and confirms the time for the lithium-ion battery unit 14 to be charged by the fuel cell unit according to the data detected. The battery management unit 16 does not influence the process of the fuel cell unit 12 adaptively charging the lithium-ion battery unit 14.

The hybrid power supply system 100 includes the plurality of power modules 10 electrically connected with each other in series. In other words, the fuel cell units 12 in each power module 10 are electrically connected with each other in series to form a fuel cell module, and the lithium-ion battery units 14 in each power module 10 are electrically connected with each other in series to form a lithium-ion battery module. The lithium-ion battery module and the fuel cell module are electrically connected with each other in parallel. In one embodiment, the hybrid power supply system 100 includes eighty fuel cell units 12 electrically connected with each other in series, and eighty lithium-ion battery units 14 electrically connected with each other in series. The fuel and the oxidant can be shared between the fuel cell units 12 in the each power module 10 for easy management.

Figure 8:
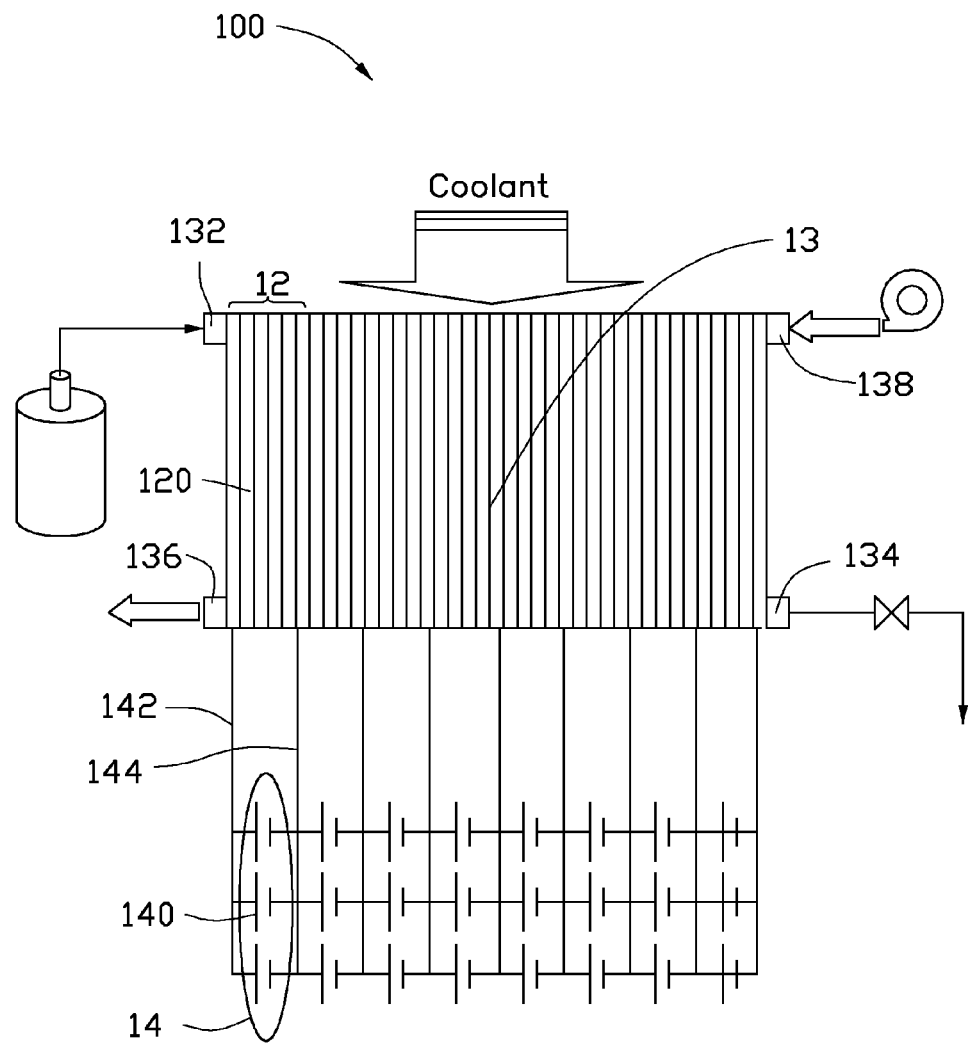
FIG. 8 is a schematic structural view of an embodiment of the hybrid power supply system.

Referring to FIG. 8, one type of the hybrid power supply system 100 is shown. A fuel cell stack 13 is formed by the plurality of fuel cell units 12 electrically connected with each other in series. The fuel cell stack 13 includes a fuel input port 132, a fuel output port 134, an oxidant input port 136, and an oxidant output port 138. The fuel cell stack 13 includes two opposite sides. All of the fuel cell monomers 120 in the fuel cell stack 13 can be crossed from one side to the opposite side. The fuel input port 132 and the oxidant input port 136 are disposed on the one side of the fuel cell stack 13. The fuel output 134 and the oxidant output port 138 are disposed on the opposite side of the fuel cell stack 13. The fuel input port 132 supplies the fuel for each fuel cell monomer 120. The oxidant input port 136 supplies the oxidant for each fuel cell monomer 120. The fuel, oxidant, and the coolant can be shared between the plurality of the fuel cell units 12. Each fuel cell unit 12 has a positive lead 122 and a negative lead 124 to connect with the lithium-ion battery unit 14 in parallel. Thus, the fuel cell unit 12 can charge the lithium-ion battery unit 14 directly.

In the hybrid supply system 100, the plurality of power modules 10 can share one battery management unit 16. In another embodiment, each power module 10 includes one battery management unit 16. If the hybrid power supply system 100 includes only one battery management unit 16, the plurality of power modules 10 can share the battery management unit 16 by using a multiplexer. The multiplexer can include an amount of independent circuits. The amount of the independent circuits is equal to the amount of the power modules 10 to make each fuel cell unit 12 capable of adaptively charging each lithium-ion battery unit 14. Therefore, the battery management system 16 has no need to design regulating circuits used to regulate a charging and discharging inconformity between the lithium-ion battery units 14. Circuits in the battery management system 16 thus can be simplified.

Referring to FIG. 1, the hybrid power supply system 100 can further include a convertor 102. The convertor 102, the fuel cell module and the lithium-ion battery module are electrically connected with each other in parallel. The output voltage of the hybrid power supply system 100 can be converted to the operating voltage of the external load 104 by the convertor 102. The series connected fuel cell units 12 and the series connected lithium-ion battery units 14 can provide power supply for the external load 104 together or separately. The convertor 102 can be a direct current-direct current convertor (DC-DC convertor) or a direct current-alternating current convertor (DC-AC convertor).

In practical application, the hybrid power supply system 100 can be electrically connected with the external load 104 via the convertor 102. The output voltage of the hybrid power supply system 100 for the external load 104 is the sum of all the power modules 10. In other words, the series connected fuel cell units 12 and the series connected lithium-ion battery units 14 can simultaneously or alternatively supply power to the external load 104.

The hybrid power supply system 100 can be used in a car. When the car is driving smoothly, the power is mainly provided by the series connected fuel cell units 12. When the car is speeding up or climbing a hill, both the series connected fuel cell units 12 and lithium-ion battery units 14 can supply power for the car. When the car is driven down a hill, breaking, or slowing down, the corresponded fuel cell unit 12 in each power module 10 can charge the lithium-ion battery unit 14. In addition, when the series connected fuel cell units 12 stop to provide power because of the fuel being used up or other reasons, the series connected lithium-ion battery units 14 can provide power to the car.

Each lithium-ion battery unit 14 can correspond to each fuel cell unit 12 for charging in the hybrid power supply system 100. Therefore, the inconformity of charging and discharging between the series connected lithium-ion battery units 14 can be avoided, and the life of the lithium-ion battery units 14 can be prolonged. In addition, an effective power utilization rate of the series connected lithium-ion battery unit 14 provided for the external load can be increased. On the other hand, the battery management unit 16 can be simplified. In other words, conventional regulating circuits used for regulating the charging and discharging inconformity between the lithium-ion battery units 14 can be avoided. Costs of the battery management unit also can be reduced. The output current of the lithium-ion battery unit 14 can be increased because of the plurality of parallel connected lithium ion battery monomers 140 therein. In addition, if one lithium ion battery monomer in the lithium-ion battery unit cannot work, other lithium ion battery monomers can still ensure the lithium-ion battery unit works normally. Reliability of the hybrid power supply system 100 thus can be increased. At last, the fuel cell unit 12 can adaptively charge the lithium-ion battery unit 14 according to a capacity of the lithium-ion battery unit 14 as the fuel cell and the lithium ion battery with similar discharging characteristics.

Finally, it is to be understood that the above-described embodiments are intended to illustrate rather than limit the present disclosure. Variations may be made to the embodiments without departing from the spirit of the present disclosure as claimed. Elements associated with any of the above embodiments are envisioned to be associated with any other embodiments. The above-described embodiments illustrate the scope of the present disclosure but do not restrict the scope of the present disclosure.

What is claimed is:

1. A hybrid power supply system comprising a plurality of power modules electrically connected with each other in series; each of the plurality of power modules comprises a fuel cell unit and a lithium-ion battery unit; each fuel cell unit comprises at least two fuel cell monomers electrically connected with each other in series; and each lithium-ion battery unit comprises one or more lithium ion battery monomers electrically connected with each other in parallel;

wherein each fuel cell unit is electrically connected with each lithium-ion battery unit in parallel and able to directly charge the lithium-ion battery unit; each of the plurality of power modules further comprises a battery management unit electrically connected with the fuel cell unit and the lithium-ion battery unit; each of the one or more lithium ion battery monomers has a cut-off charge voltage and a cut-off discharge voltage; and the battery management unit comprises:

a detection circuit adapted to detect operating voltages, current, and temperature of the fuel cell unit and the lithium-ion battery unit;

a control circuit adapted to compare the voltage of the lithium-ion battery unit with the cut-off charge voltage or the cut-off discharge voltage;

an over-charge protective circuit adapted to prevent the lithium-ion battery unit from being overcharged by the fuel cell unit; and an over-discharge protective circuit adapted to prevent the lithium-ion battery unit and the fuel cell unit from being discharged exceeding the cut-off discharge voltage thereof.

2. The hybrid power supply system of claim 1, wherein the fuel cell units are electrically connected with each other in series; and the lithium-ion battery units are electrically connected with each other in series.

3. The hybrid power supply system of claim 1, wherein a fuel, oxidant, and coolant are shared between the fuel cell units.

4. The hybrid power supply system of claim 1, wherein one of the one or more lithium ion battery monomers is selected from the group consisting of a lithium iron phosphate battery, a lithium cobalt oxide battery, a lithium manganese oxide battery, and a lithium cobalt manganese oxide battery.

5. The hybrid power supply system of claim 1, wherein an open circuit voltage of the fuel cell unit is about two times to about four times greater than a cut-off charge voltage of the lithium-ion battery unit in each of the plurality of power modules.

6. The hybrid power supply system of claim 5, wherein the open circuit voltage of the fuel cell unit is about two times greater than the cut-off charge voltage of the lithium-ion battery unit.

7. The hybrid power supply system of claim 1, wherein one of the at least two fuel cell monomers is selected from the group consisting of an alkaline fuel cell, a solid oxide fuel cell, or a proton membrane exchange fuel cell.

8. The hybrid power supply system of claim 1, wherein a short-circuit current of the fuel cell unit is smaller or equal to a maximum charge current of the lithium-ion battery unit.

9. The hybrid power supply system of claim 1, wherein the battery management unit further comprises an anti-reverse charge circuit adapted to prevent the fuel cell unit from being charged by the lithium-ion battery unit.

10. The hybrid power supply system of claim 1 further comprising a convertor electrically connected with the plurality of power modules in parallel.

11. The hybrid power supply system of claim 10, wherein the convertor comprises a direct current-direct current convertor or a direct current-alternating current convertor.

12. A hybrid power supply system, comprising:

a plurality of power modules;

a fuel cell stack comprising a plurality of fuel cell units electrically connected in series; and a plurality of lithium-ion battery units electrically connected in series;

wherein each fuel cell unit has a positive leading out terminal and a negative leading out terminal connected with each lithium-ion battery unit in parallel, each power module comprises the fuel cell unit and the lithium-ion battery unit connected with the fuel cell in parallel, each of the plurality of power modules further comprises a battery management unit electrically connected with the fuel cell unit and the lithium-ion battery unit, and each of the one or more lithium ion battery monomers has a cut-off charge voltage and a cut-off discharge voltage, and the battery management unit comprises:

a detection circuit adapted to detect operating voltages, current, and temperature of the fuel cell unit and the lithium-ion battery unit;

a control circuit adapted to compare the voltage of the lithium-ion battery unit with the cut-off charge voltage or the cut-off discharge voltage;

an over-charge protective circuit adapted to prevent the lithium-ion battery unit from being overcharged by the fuel cell unit; and an over-discharge protective circuit adapted to prevent the lithium-ion battery unit and the fuel cell unit from being discharged exceeding the cut-off discharge voltage thereof.

13. The hybrid power supply system of claim 12, wherein each lithium-ion battery unit comprises a plurality of lithium ion battery monomers electrically connected in parallel.

\* \* \* \* \*